US006914775B2

(12) United States Patent
Song

(10) Patent No.: US 6,914,775 B2
(45) Date of Patent: Jul. 5, 2005

(54) MAIN UNIT CASING ASSEMBLY FOR ELECTRONIC PRODUCTS

(75) Inventor: Sung-Ming Song, Taipei (TW)

(73) Assignee: Inventec Corporation, Taipei (TW)

( * ) Notice: Subject to any disclaimer, the term of this patent is extended or adjusted under 35 U.S.C. 154(b) by 109 days.

(21) Appl. No.: 10/401,786

(22) Filed: Mar. 31, 2003

(65) Prior Publication Data

US 2004/0075975 A1 Apr. 22, 2004

(30) Foreign Application Priority Data

Oct. 22, 2002 (TW) ........................................ 91216834 U

(51) Int. Cl.$^7$ ................................................. G06F 1/16
(52) U.S. Cl. .................... 361/683; 292/202; 312/223.2; 248/638
(58) Field of Search ................................. 361/679–687, 361/724–727; 292/203, 202; 312/223.1–223.2; 248/638

(56) References Cited

U.S. PATENT DOCUMENTS

| 6,717,816 B1 | * | 4/2004 | Tanaka et al. | ............... 361/728 |
| 6,757,160 B2 | * | 6/2004 | Moore et al. | ............... 361/683 |
| 2004/0027795 A1 | * | 2/2004 | Lee et al. | ................... 361/683 |

\* cited by examiner

Primary Examiner—Hung Van Duong
(74) Attorney, Agent, or Firm—Birch, Stewart, Kolasch & Birch, LLP

(57) ABSTRACT

A main unit casing assembly for electronic products is provided, including a casing and a plurality of body panels. The body panels are directly assembled to the casing to cover the casing and form a containing space, thereby not having to use a top casing of a main unit of the electronic product in the prior art. The use of this casing assembly can reduce the thickness of the casing assembly while still maintaining structural strength of the casing assembly, making the electronic product with such a casing assembly more compact in size.

12 Claims, 4 Drawing Sheets

MAIN UNIT CASING ASSEMBLY FOR ELECTRONIC PRODUCTS

FIELD OF THE INVENTION

The present invention relates to main unit casing structures for electronic products, and more particularly, to a main unit casing assembly that is characterized by direct assembly of body panels onto a main unit casing to reduce the thickness of the main unit casing for the electronic products.

BACKGROUND OF THE INVENTION

Due to flourishing developments of information technology, electronic products currently in market such as computers have been commonly applied to our daily lives nowadays. In particular, notebook computers are capable of replacing conventional desktop computers of relatively larger size to save precious space on desks, and most importantly their compact size is easy and convenient for carrying around which meets the users' requirements for mobility convenience. As such, the light weighted, compact-size notebook computers are increasingly popular because they are able to satisfy the users' demands.

In terms of the local computer system market, the sales volume of notebook computers have gradually exceeded that of desktop computers. To a certain group of people who needs immense mobility and constant traveling, notebook computers which can be easily placed in a handbag, back bag or hand carry for immediate use if necessary, have thus become the best choice for consumers and often are deemed the primary choice for buying as a first computer. Therefore most computer manufacturers strive to put continuing efforts into researching and developing new designs for their computers in order to win consumers' favors, especially to satisfy the ongoing demands for easy-to-carry and slim computer profile.

The electronic products often seen on market such as notebook computers assembly as shown in FIGS. 1 and 2, in which a main unit casing assembly 1 coupled to a liquid crystal display part (not shown) is composed by a main unit top cover 2 having a certain thickness and a main unit bottom cover 4, said main unit top cover 2 respectively formed with an electrically conductive circuit board (not shown) exposed thereto with a keyboard 22, a touch-control panel 24, and an array of shortcut keys 26 by a first opening 21, a second opening 23 and a third opening 25. The main unit bottom cover 4 is assembled onto the main unit top cover 2 to form a containing space 42 for accommodating necessary components and devices therein.

The main unit casing assembly 1 is further formed with a plurality of extending grooves and connecting ports so as to electrically connect outwardly to peripheral devices such as CD-ROM, hard disc, recording device, power supply and floppy disc, etc. for expanding the functionality of the computer mainframe. Therefore it is not illustrated herein because it is well-known prior art in order to simplify the illustrated drawings. The main unit top cover 2 and the main unit bottom cover 4 further comprise elements disclosed in the prior arts such as buckling and fastening members, or locking elements for locking screws (not shown) so as to fasten the main unit top cover 2 and the bottom cover 4 thereto.

In assembling said main unit casing assembly 1, the keyboard 22, the touch control panel 24, and the array of shortcut keys 26 each being respectively exposed to the outside of the main unit top cover 2 to form a first opening 21, a second opening 23 and a third opening 25, thereby fastening the main unit top cover 2 with the main unit bottom cover 4 by a plurality of fastening elements to accomplish the main unit casing assembly 1, as illustrated in FIG. 2.

A conventional notebook main unit casing assembly 1 has to accommodate peripheral devices such as a keyboard 22, a touch control panel 24, and an array of shortcut keys 26 composed by a containing space 42 on the top cover 2, after assembling the main unit top cover 2 and the main unit bottom cover 4, the overall height H of the main unit casing is a combination of the height of the main unit top cover 2 'h1' and the main unit bottom cover 4 'h2', therefore the thickness of the main unit casing assembly cannot be reduced effectively and fails to meet the demand of profile miniaturization of electronic products.

Moreover, the foregoing main unit top cover 2 is generally made of larger scale molding injection that result in costly molding tools, and also is inefficient to fabricate compared to that of smaller scale molding injection. Inevitably the overall high material cost directly affects the unit price of sales, making it relatively high and unfavorable in the market.

SUMMARY OF THE INVENTION

A primary objective of this invention is to provide a main unit casing assembly for electronic products without having to using main unit top casings.

Another objective of this invention is to provide a main unit casing assembly, which effectively reduces the thickness of conventional main unit casings for electronic products.

In accordance with the foregoing and other objectives, the present invention provides a main unit casing assembly for electronic products, comprising at least: a casing having an opening and a containing space; a plurality of body panels having input modules, allowing each body panel to be planarly connected to one another to be assembled to the casing; after being assembled, each body panel is assembled planarly as an integrated part, and each assembled body panel conceals a corresponding opening on the casing for allowing the components and devices in the containing space to be electrically connected with a circuit board thereto.

By using the configuration of said main unit casing assembly, there is no need to adopt a conventional main unit top casing as mentioned above, thereby reducing the thickness of the main unit top casing while also maintaining the structural strength of the main unit casing such that the overall height of the electronic products can be effectively reduced.

Moreover, the number of aforementioned body panels can be adjusted according to the configuration of the main unit casing, provided that a coplanar connection can be formed on each opening after being assembled and that the openings on the casing can be concealed. Thus, the present invention capable of interlocking each panel body thereto can replace conventional main unit top casing in the prior arts, thereby reducing the thickness of the main unit top casings.

In provision of the foregoing main unit casing assembly, it can be accomplished by any means disclosed in the prior arts, such as a fixed position pillar with a corresponding tenon, a screw with a corresponding hole or a buckling element with a corresponding buckling hole for fastening the parts, provided that each body panel can be planarly assembled as an integrated part to maintain the structural strength of the main unit casing assembly.

Also, each opening being exposed the outside of the body panels can accommodate input devices such as a keyboard having a plurality of keys, a touch control panel, a handwriting board, etc. in order to meet the users' requirements without limitation of the number of the parts being adopted thereto.

BRIEF DESCRIPTION OF DRAWINGS

The invention can be fully understood by reading the following detailed description of the preferred embodiments, with reference made to the accompanying drawings, wherein.

DETAILED DESCRIPTION OF PREFERRED EMBODIMENTS

The preferred embodiments of this invention are made for use on notebook computers, which can be applied to all conventional notebook computers introduced in the prior art, due to the fact that the irrelevant features of the present invention remain unchanged. Thus, for highlighting and simplifying the structure and features of the invention, the drawings herein illustrate only the basic configuration of the main unit casing assembly with respect to the features of the present invention without further detailing the well-known part disclosed by the prior arts.

Figure 1:
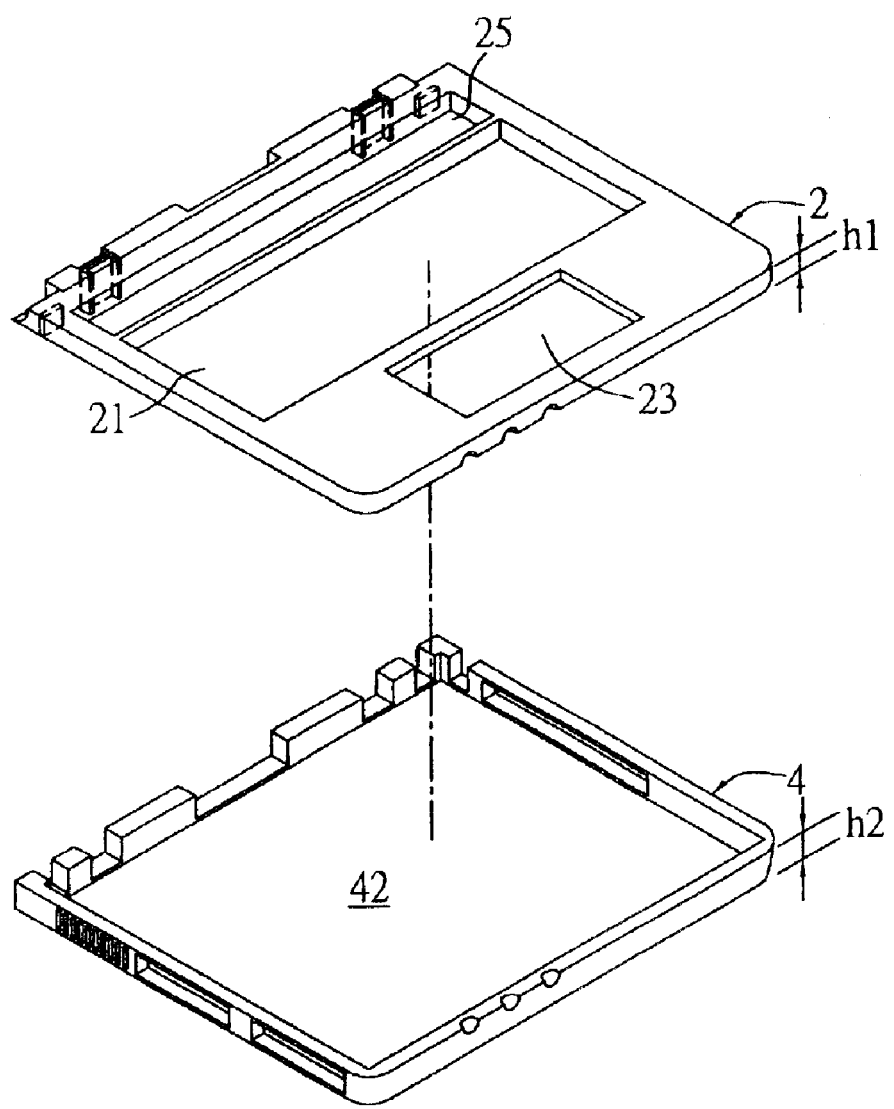
FIG. 1 (PRIOR ART) is a structural exploded view of a conventional main unit casing assembly for a notebook computer.
Figure 2:
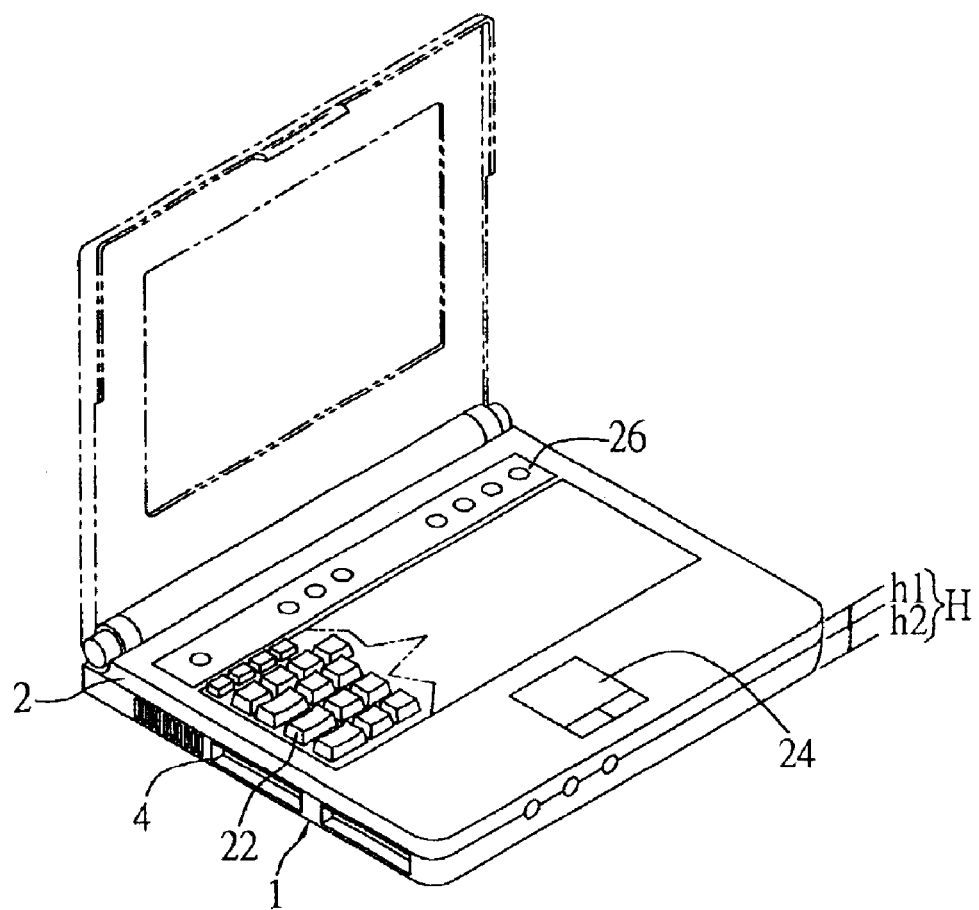
FIG. 2 (PRIOR ART) is a perspective view of a notebook computer.
Figure 3:
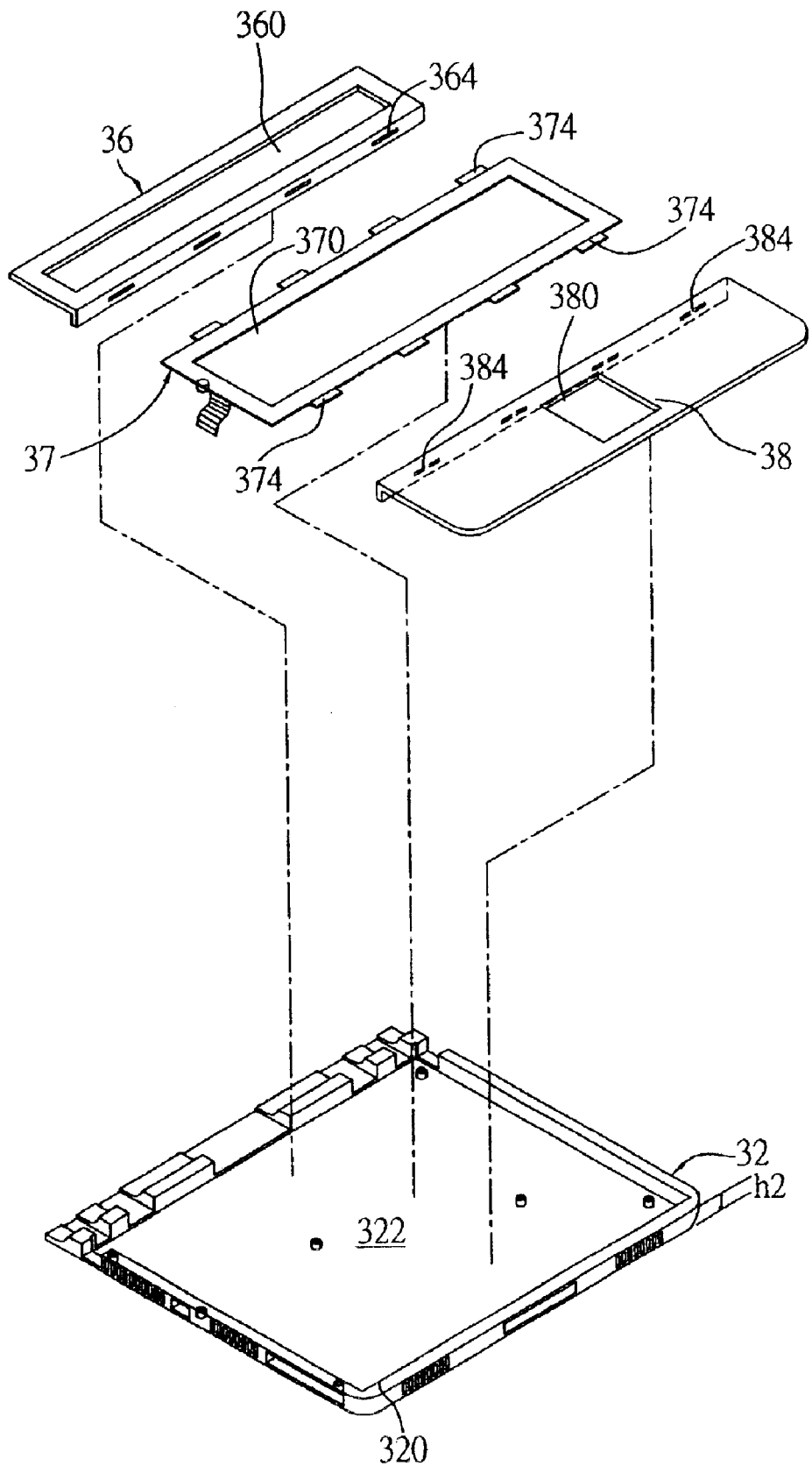
FIG. 3 is a structural exploded view of a main unit casing assembly according to the invention.

As illustrated in FIG. 3, the main unit casing assembly 30 of the present invention comprises a casing 32 and a first panel body 36, a second panel body 37 and a third panel body 38, all capable of being planarly engaged with one another to form an integrated part.

The casing 32 is formed with an opening 320 and a containing space 322 to accommodate peripheral devices of a notebook computer such as a heat-radiating component, a power supply, a hard disc, a mainframe board, a CD-ROM and other components (all not shown) one by one into the containing space 322 so each part can be electrically connected to a circuit board thereto by means of wire-aligning or wire-transferring.

The first body panel 36 is made to expose shortcut keys or a power supply component to the outside of its corresponding opening 360 for displaying and operating when in use; the third body panel 38 also exposes a hand-writing board or a touch control panel to the outside of its corresponding opening 380 for operation by the user; similarly the second body panel exposes the keyboard to the outside of its corresponding opening 307 for operation by the user.

Figure 4:
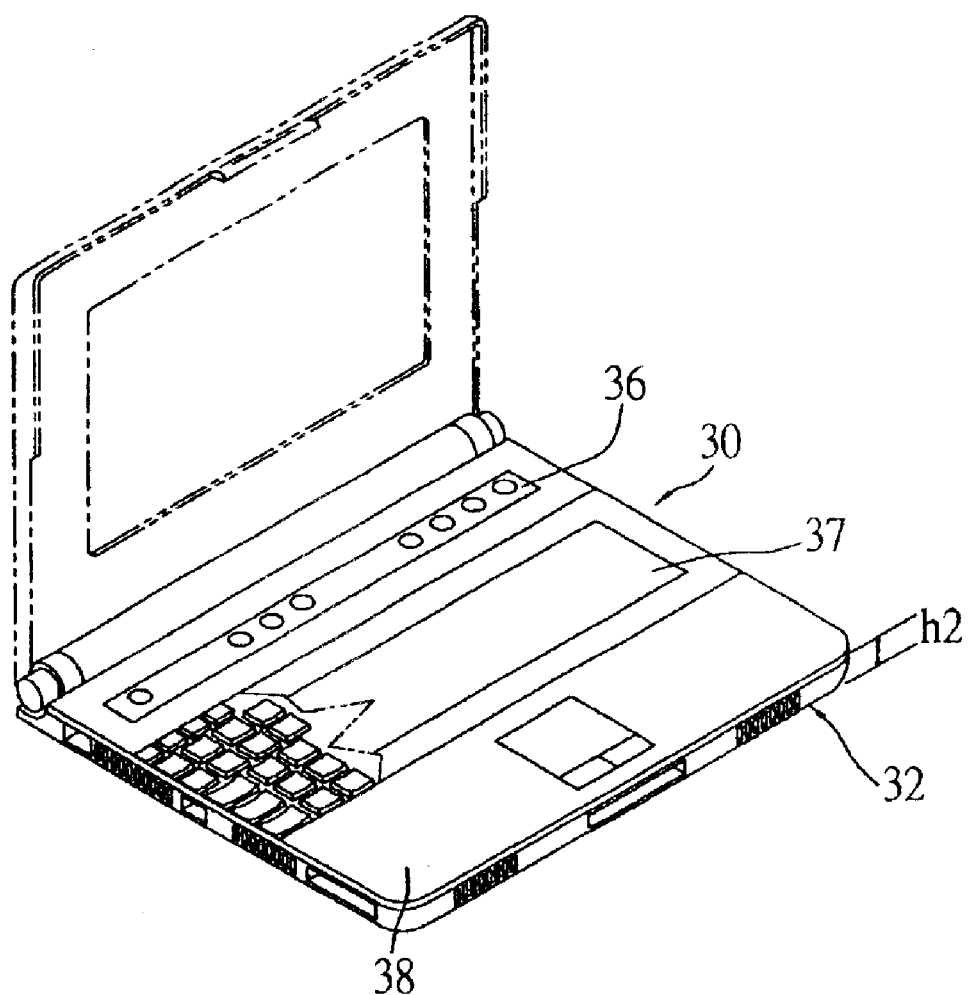
FIG. 4 is a perspective view of the main unit casing assembly according to the invention after being assembled to an electronic product.

The second body panel 37 corresponds to the first body panel 36 and the third body panel 38, each side of the second body panel is respectively formed with a plurality of planarly protruding buckling portions 374. Similarly the first body panel 36 and the third body panel 38 corresponds to the second body panel 37, each side of the first body panel 36 is respectively formed with a plurality of buckling holes 364, 384 for fastening thereto with the buckling portions 374, such that the first body panel 36, the second body panel 37 and the third body panel 38 are orderly assembled to form a coplanar connection for assembling to the opening 320 of the casing 32, as shown in FIG. 4. Thus the main unit casing assembly of present invention is accomplished with an overall height of h2.

The present invention certainly can be accomplished by assembling any of the aforementioned panel body onto the opening 320 of the casing 32, and then assemble the other body panels onto the opening 320 of the casing 32 to form a coplanar combination as an integrated part without having to adopting the conventional top cover assembly 30 as introduced in the prior art.

In other words, the order for assembling the casing 32 of the present invention is not limited to the aforementioned embodiments, that is, the order of assembling between different body panels and between each body panel and the casing can be flexibly changed, provided that the foregoing body panels 36, 37 and 38 can be planarly assembled onto the openings 320 of the casing 32 to form a coplanar combination as an integrated part capable of accommodating other necessary components within the containing space 322 and maintaining the structural strength of the main unit casing assembly 30.

Moreover, the number of the foregoing body panels is not limited to only three pieces, it can be two body panels, four body panels or any combination with more than one body panel adapted in compliance with the configuration of the main unit casing, provided that after assembling the panel bodies onto the opening 320 of the casing 32, the result forms a coplanar connection which conceals the openings of the casing 32.

Therefore, compared to the conventional main unit top casing having an assembled height equaled to 'H2' which combines the height of the main unit top cover 2 with the height of the main unit bottom cover 4, the present invention is characterized by the use of direct assembly of each panel body to replace the thickness of the main unit top casing to reduce the assembled height to only h2, thereby making the main unit casing assembly of the invention more compact in favor of profile miniaturization.

Furthermore, the number of the openings of body panels is not limited to only one as indicated in the foregoing preferred embodiments, it can be without any opening at all or more than one opening depending upon the number of components required in the containing space that need to be exposed to outside of the openings for operation by the user to comply with users' needs at users' convenience.

Also, the means of assembling each panel body 36, 37, and 38 in a coplanar connection is not limited to only buckling as indicated in the preferred embodiments, provided that each panel body 36, 37 and 38 can be planarly assembled to form an integrated part and maintain the structural strength of the main unit casing assembly.

The main unit casing assembly of the present invention for electronic products can be accomplished without having to use conventional main unit top casing disclosed in prior arts, the present invention accomplished by attaching body panels to the casing as a main unit casing assembly, the combined body panels as an integrated part replaces the conventional main unit top casing having larger height, it not only reduces the thickness of main unit casing but also maintains the structural strength of casing assembly, making the main unit casing more compact, thereby reducing the overall height of the main unit casing assembly.

In addition, it should be noted that the electronic products mentioned in this invention are not limited to only notebook computers as indicated in the preferred embodiments, the main unit casing assembly of the present invention can be also applied to other products such as palm computers, the electronic dictionaries, personal digital assistants (PDA) or the electronic games.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretations so as to encompass all such modifications and similar arrangements.

What is claimed is:

1. A main unit casing assembly for electronic products, comprising:
   a casing having an opening and a containing space; and
   a plurality of body panels, each of the plurality of body panels being planarly connectable to one another, the plurality of body panels being assembled on the opening of the casing to allow at least one input module received in the containing space to be exposed to an outside of the casing and to be operable user.

2. The main unit casing assembly of claim 1, wherein the plurality of body panels are formed with openings for accommodating input modules.

3. The main unit casing assembly of claim 1, wherein the input module is a keyboard.

4. The main unit casing assembly of claim 1, wherein the plurality of body panels are assembled to the casing by coupling, buckling or screwing.

5. The main unit casing assembly of claim 1, wherein the electronic product is selected from the group consisting of a notebook computer, palm computer, electronic dictionary, personal digital assistant (PDA), and electronic game machine.

6. The main unit casing assembly of claim 1, wherein one of the plurality of body panels has at least one buckling portion and another one of the plurality of body panels has at least one buckling hole corresponding to the at least one buckling portion, the one and the another one of the plurality of body panels being connected by the least one buckling portion being inserted into the at least one buckling hole.

7. The main unit casing assembly of claim 2, wherein the input module is selected from the group consisting of a keyboard, a touch control panel, a hand-writing board, and an array of shortcut keys.

8. A main unit casing assembly for electronic products, comprising:
   a casing having an opening and a containing space; and
   a plurality of body panels, each of the plurality of body panels being planarly connectable to one another, the plurality of body panels being assembled on the opening of the casing and formed with openings for accommodating input modules, allowing at least one input module received in the containing space to be exposed to an outside of the casing and to be operable by a user.

9. The main unit casing assembly of claim 8, wherein the input module is selected from the group consisting of a keyboard, a touch control panel, a hand-writing board, and an array of shortcut keys.

10. The main unit casing assembly of claim 8, wherein the plurality of body panels are assembled to the casing by coupling, buckling or screwing.

11. The main unit casing assembly of claim 8, wherein the electronic product is selected from the group consisting of a notebook computer, palm computer, electronic dictionary, personal digital assistant (FDA), and electronic game machine.

12. The main unit casing assembly of claim 8, wherein one of the plurality of body panels has at least one buckling portion and another one of the plurality of body panels has at least one buckling hole corresponding to the at least one buckling portion, the one and the another one of the plurality of body panels being connected by the least one buckling portion being inserted into the at least one buckling hole.

* * * * *